US007986539B2

(12) United States Patent
Fornage

(10) Patent No.: US 7,986,539 B2
(45) Date of Patent: *Jul. 26, 2011

(54) METHOD AND APPARATUS FOR MAXIMUM POWER POINT TRACKING IN POWER CONVERSION BASED ON DUAL FEEDBACK LOOPS AND POWER RIPPLES

(75) Inventor: Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 374 days.

This patent is subject to a terminal disclaimer.

(21) Appl. No.: 12/284,830

(22) Filed: Sep. 25, 2008

(65) Prior Publication Data

US 2009/0080226 A1 Mar. 26, 2009

Related U.S. Application Data

(60) Provisional application No. 60/995,408, filed on Sep. 26, 2007.

(51) Int. Cl.
*H02M 7/00* (2006.01)
*H01H 9/54* (2006.01)

(52) U.S. Cl. .......................................... 363/74; 307/140

(58) Field of Classification Search .................... 363/74, 363/95, 131; 307/140; 323/299, 906
See application file for complete search history.

(56) References Cited

U.S. PATENT DOCUMENTS

| | | | | |
|---|---|---|---|---|
| 4,375,662 | A * | 3/1983 | Baker | 363/95 |
| 4,404,472 | A | 9/1983 | Steigerwald | |
| 4,649,334 | A | 3/1987 | Nakajima | |
| 5,604,430 | A | 2/1997 | Decker et al. | |
| 6,351,400 | B1 | 2/2002 | Lumsden | |
| 6,678,176 | B2 | 1/2004 | Lumsden | |
| 6,809,942 | B2 | 10/2004 | Madenokouji et al. | |
| 6,844,739 | B2 | 1/2005 | Kasai et al. | |
| 6,919,714 | B2 | 7/2005 | Delepaut | |
| 6,984,970 | B2 | 1/2006 | Capel | |
| 7,053,506 | B2 | 5/2006 | Alonso et al. | |

(Continued)

OTHER PUBLICATIONS

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.

(Continued)

*Primary Examiner* — Adolf Berhane
(74) *Attorney, Agent, or Firm* — Moser Taboada

(57) ABSTRACT

A method and apparatus for converting DC input power to AC output power. The apparatus comprises a conversion module comprising an input capacitor, and a first feedback loop for determining a maximum power point (MPP) and operating the conversion module proximate the MPP. The apparatus additionally comprises a second feedback loop for determining a difference in energy storage and delivery by the input capacitor, producing an error signal indicative of the difference, and coupling the error signal to the first feedback loop to adjust at least one operating parameter of the conversion module to drive toward the MPP.

17 Claims, 6 Drawing Sheets

U.S. PATENT DOCUMENTS

| | | | | |
|---|---|---|---|---|
| 7,091,707 | B2 | 8/2006 | Cutler | |
| 7,158,395 | B2 * | 1/2007 | Deng et al. | 363/95 |
| 7,319,313 | B2 * | 1/2008 | Dickerson et al. | 323/288 |
| 7,420,354 | B2 | 9/2008 | Cutler | |
| 7,432,691 | B2 | 10/2008 | Cutler | |
| 7,479,774 | B2 | 1/2009 | Wai et al. | |
| 7,521,914 | B2 * | 4/2009 | Dickerson et al. | 323/288 |
| 7,768,155 | B2 * | 8/2010 | Fornage | 307/140 |
| 7,839,025 | B2 * | 11/2010 | Besser et al. | 307/99 |
| 2004/0207366 | A1 | 10/2004 | Sung | |
| 2004/0264225 | A1 | 12/2004 | Bhavaraju et al. | |
| 2005/0254191 | A1 | 11/2005 | Bashaw et al. | |
| 2007/0159866 | A1 | 7/2007 | Siri | |
| 2007/0221267 | A1 | 9/2007 | Fornage | |
| 2008/0111517 | A1 | 5/2008 | Pfeifer et al. | |
| 2008/0143188 | A1 | 6/2008 | Adest et al. | |
| 2008/0183338 | A1 | 7/2008 | Kimball et al. | |
| 2008/0290252 | A1 | 11/2008 | Leonhardt et al. | |

OTHER PUBLICATIONS

"IEEE Recommended Practice for Utility Interface of Photovoltaic (PV) Systems," IEEE Std 929-2000, Approved Jan. 30, 2000, Copyright 2000 IEEE.

Bower, Ward et al., "Performance Test Protocol for Evaluating Inverters Used in Grid-Connected Photovoltaic Systems," DRAFT Oct. 2004.

Esram, T. and Chapman, P. L., "Comparison of Photovoltaic Array Maximum Power Point Tracking Techniques," IEEE Trans. Energy Conversion, vol. 22, No. 2, Jun. 2007.

Bower, Ward Isaac, "The AC PV Building Block Ultimate Plug-n-Play That Brings Photovoltaics Directly to the Customer," U.S. Department of Energy Contract DE-AC04-94AL85000, published Feb. 1, 2003, pp. 1-4.

Bower, Ward I. et al., "Innovative Micro-Inverter for the AC PV Building Block of AC Modules," Copyright 2005 by ASME.

* cited by examiner

METHOD AND APPARATUS FOR MAXIMUM POWER POINT TRACKING IN POWER CONVERSION BASED ON DUAL FEEDBACK LOOPS AND POWER RIPPLES

CROSS-REFERENCE TO RELATED APPLICATIONS

This application claims benefit of U.S. provisional patent application Ser. No. 60/995,408, filed Sep. 26, 2007, which is herein incorporated by reference.

BACKGROUND OF THE INVENTION

1. Field of the Invention

Embodiments of the present disclosure generally relate to power conversion and, more particularly, to a method and apparatus for power conversion with maximum power point tracking utilizing dual feedback loops.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

PV modules have a nonlinear relationship between the current (I) and voltage (V) that they produce. A maximum power point (MPP) on an I-V curve of a PV module identifies the optimal operating point of the PV module; when operating at this point, the PV module generates the maximum possible power output for a given temperature and solar irradiance. Therefore, in order to optimize power drawn from a PV module, it is imperative that the PV module is biased at an operating voltage corresponding to the MPP (i.e., the MPP voltage). Additionally, the PV module operating voltage must be rapidly adjusted to compensate for changes in solar irradiance and/or temperature that impact the MPP.

Therefore, there is a need in the art for a method and apparatus for efficiently operating a PV module at an MPP.

SUMMARY OF THE INVENTION

Embodiments of the present invention generally relate to a method and apparatus for converting DC input power to AC output power. The apparatus comprises a conversion module comprising an input capacitor, and a first feedback loop for determining a maximum power point (MPP) and operating the conversion module proximate the MPP. The apparatus additionally comprises a second feedback loop for determining a difference in energy storage and delivery by the input capacitor, producing an error signal indicative of the difference, and coupling the error signal to the first feedback loop to adjust at least one operating parameter of the conversion module to drive toward the MPP.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
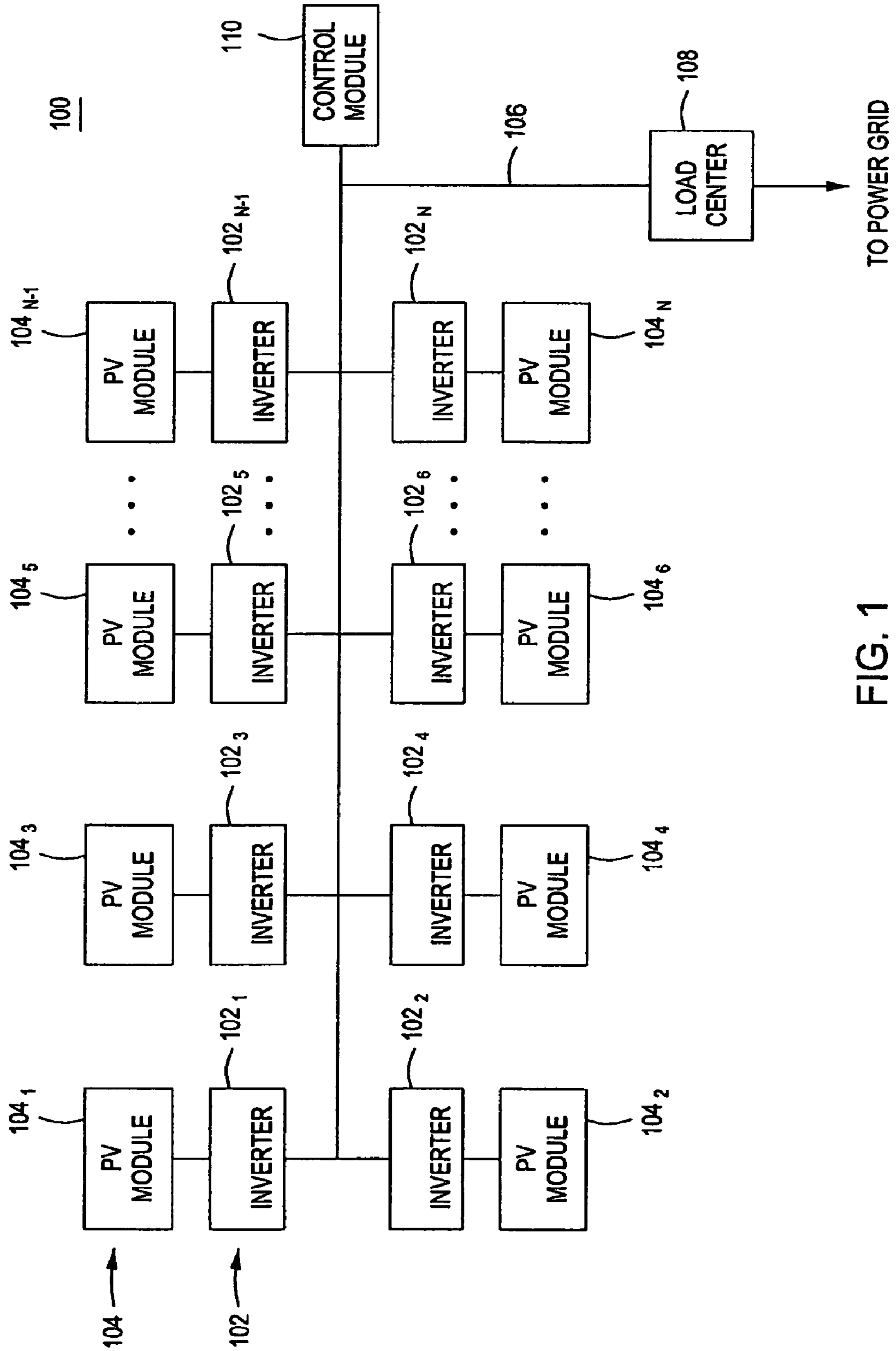
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $\mathbf{102}_1$, $\mathbf{102}_2$ . . . $\mathbf{102}_n$, collectively referred to as inverters 102, a plurality of PV modules $\mathbf{104}_1$, $\mathbf{104}_2$ . . . $\mathbf{104}_n$, collectively referred to as PV modules 104, an AC bus 106, a load center 108, and an array control module 110.

Each inverter $\mathbf{102}_1$, $\mathbf{102}_2$ . . . $\mathbf{102}_n$ is coupled to a PV module $\mathbf{104}_1$, $\mathbf{104}_2$ . . . $\mathbf{104}_n$, respectively. In some embodiments, a DC-DC converter may be coupled between each PV module 104 and each inverter 102 (i.e., one converter per PV module 104). Alternatively, multiple PV modules 104 may be coupled to a single inverter 102 (i.e., a centralized inverter); in some embodiments, a DC-DC converter may be coupled between the PV modules 104 and the centralized inverter.

In accordance with one or more embodiments of the present invention, each inverter 102 drives the subtending PV module 104 to operate at an MPP such that the PV module 104 generates an optimal power output for a given temperature and solar irradiation. The inverters 102 are coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and meter out AC current that is in-phase with the AC commercial power grid voltage. The system 100 couples the generated AC power to the commercial power grid via the load center 108.

A control module 110 is coupled to the AC bus 106. The control module 110 is capable of issuing command and control signals to the inverters 102 in order to control the functionality of the inverters 102.

Figure 2:
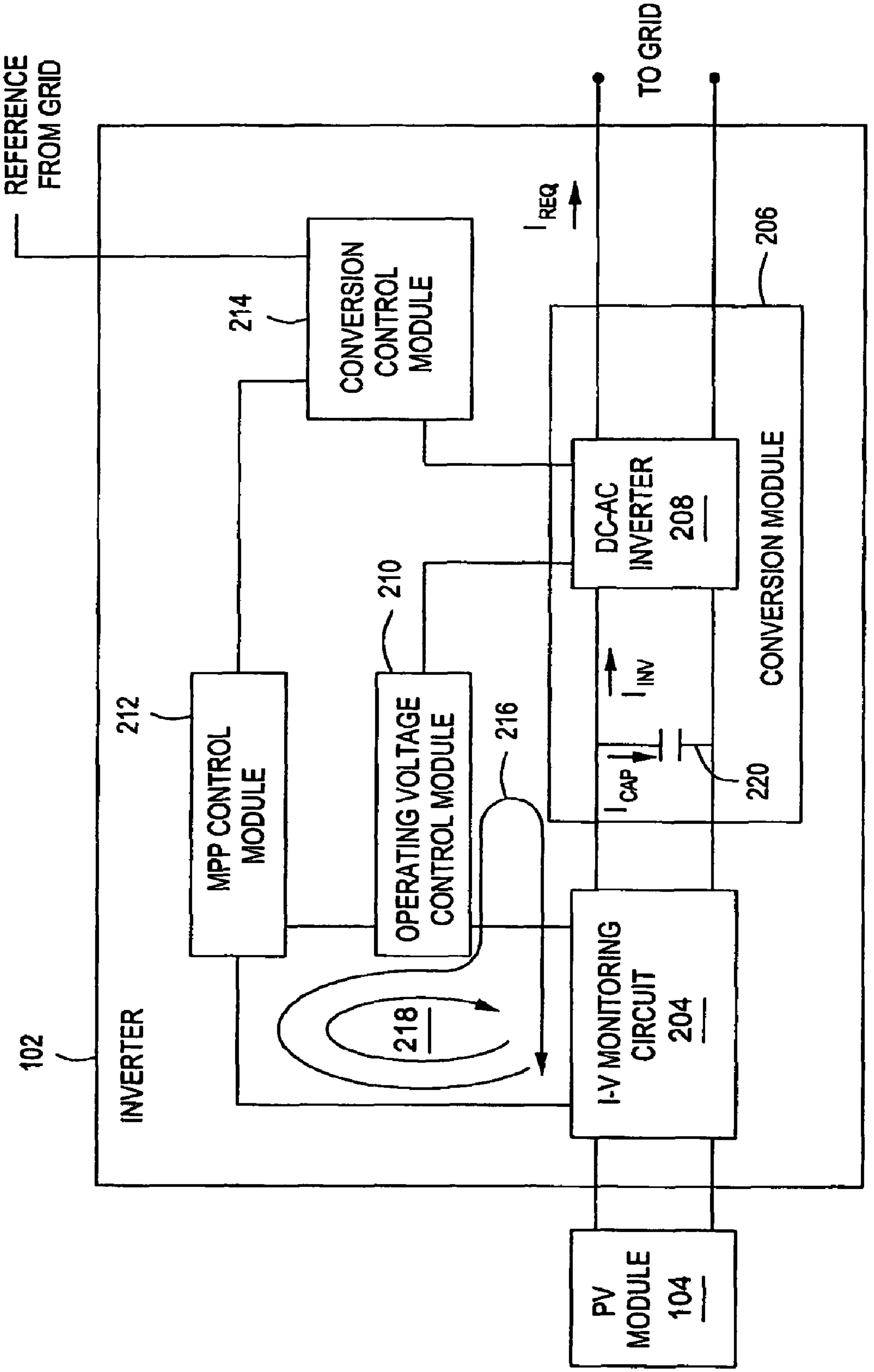
FIG. 2 is a block diagram of an inverter in accordance with one or more embodiments of the present invention.

FIG. 2 is a block diagram of an inverter 102 in accordance with one or more embodiments of the present invention. The inverter 102 comprises an I-V monitoring circuit 204, a conversion module 206, an operating voltage control module 210, an MPP control module 212, and a conversion control module 214. The inverter 102 is coupled to the PV module 104 and to the commercial power grid.

The I-V monitoring circuit 204 is coupled to the PV module 104, the conversion module 206, the operating voltage control module 210, and the MPP control module 212. The MPP control module 212 is further coupled to the operating voltage control module 210 and the conversion control module 214. The I-V monitoring circuit 204 monitors the instantaneous voltage (i.e., the operating voltage) and current output from the PV module 104. The I-V monitoring circuit 204 provides a signal indicative of the PV module voltage to the operating voltage control module 210, and further provides signals indicative of the PV module voltage and current to the MPP control module 212. The operating voltage control module 210 functions to bias the PV module 104 at a desired operating voltage, while the MPP control module 212 drives such desired operating voltage to the MPP voltage, as further described below.

In addition to being coupled to the I-V monitoring circuit 204, the conversion module 206 is coupled to the operating voltage control module 210, the conversion control module 214, and the commercial power grid. The conversion module 206 comprises an input capacitor 220 coupled to the I-V monitoring circuit 204 and to a DC-AC inverter 208; additionally, the DC-AC inverter 208 is coupled to the operating voltage control module 210, the conversion control module 214, and the commercial power grid.

The conversion module 206 receives an input of a DC current through the I-V monitoring circuit 204 and converts the DC current to a required AC output current, $I_{req}$. A current $I_{cap}$ flows through the capacitor 220 and a current $I_{inv}$ is supplied to the DC-AC inverter 208 in accordance with the required AC output current $I_{req}$. Thus, the $I_{req}$ generated by the conversion module 206 controls the current drawn from the PV module 104 and inherently sets the PV module operating voltage.

The conversion control module 214 receives a reference signal from the commercial power grid, and provides the control signals for the DC-AC inverter 208 to convert the DC current $I_{inv}$ to the AC output current $I_{req}$. One example of such power conversion is commonly assigned U.S. Patent Application Publication Number 2007/0221267 entitled "Method and Apparatus for Converting Direct Current to Alternating Current" and filed Sep. 27, 2007, which is herein incorporated in its entirety by reference. The AC output current from the DC-AC inverter 208 is coupled to the commercial power grid such that it is in-phase with the commercial AC current.

The operating voltage control module 210 employs a first feedback loop (the "inner" loop) 216 to bias the PV module 104 at a desired operating voltage by modulating the current drawn from the PV module 104. The first feedback loop 216 comprises the I-V monitoring circuit 204, the MPP control module 212, the operating voltage control module 210, and the conversion module 206. The operating voltage control module 210 obtains a signal indicative of the instantaneous PV module operating voltage from the I-V monitoring circuit 204, and an error signal from the MPP control module 212; additionally, the operating voltage control module 212 receives a pre-defined nominal voltage input. The summation of the nominal voltage and the error signal comprise a desired operating voltage for the PV module 104. Based on a difference between the instantaneous PV module operating voltage and the desired operating voltage, the first feedback loop 216 drives the conversion module 206 such that the appropriate current is drawn from the PV module 104 to bias the PV module 104 at the desired operating voltage. Thus, the first feedback loop 216 iteratively computes a difference between an instantaneous PV module operating voltage and a desired PV module operating voltage and accordingly adjusts the current drawn from the PV module 104 such that the PV module 104 is biased at the desired operating voltage, i.e., an operating current and voltage that approximately corresponds to the MPP.

The MPP control module 212 employs a second feedback loop 218 (the "outer" loop) to adjust the desired operating voltage such that it corresponds to the MPP voltage. The second feedback loop 218 comprises the I-V monitoring circuit 204, the MPP control module 212, and the operating voltage control module 210. The MPP control module 212 receives signals indicative of the instantaneous PV module operating voltage and output current from the I-V monitoring circuit 204 and computes the instantaneous output power from the PV module 104. The MPP control module 212 determines a difference between the PV module output power generated during two portions of an AC grid cycle and, based on the difference, modifies the voltage control of the first feedback loop 216 such that the desired operating voltage corresponds to the MPP voltage. The second feedback loop 218 thus iteratively determines whether the PV module 104 is operating at the MPP and, in the case where the PV module 104 is not operating at the MPP, modifies at least one operating parameter within the first feedback loop 216 to achieve the MPP (i.e., the outer loop "fine tunes" the setting established by the inner loop).

The inverter 102 generates an AC output power that is in-phase with the AC grid power. As such, the inverter output power fluctuates between zero output power at the AC grid voltage zero-crossings, and peak output power at the AC grid voltage peak positive and negative amplitudes. When the inverter output power must be zero, i.e., at the AC grid voltage zero-crossings, the required inverter output current $I_{req}$ is zero; at such time, current from the PV module 104 is prohibited from flowing to the DC-AC inverter 208 and therefore charges the capacitor 220. When the inverter output power must be peak, i.e., at the AC grid voltage peak positive and negative amplitudes, energy stored in the capacitor 220 is utilized in addition to the instantaneous power from the PV module 104 to generate a peak inverter output power at twice the average PV module output power. Thus, the charging and discharging of the capacitor 220 during provides an AC component overriding the average power provided by the PV module 104.

The AC output power from the inverter 102 oscillates at twice the frequency of the AC grid voltage and comprises a peak output power of twice the average PV module power occurring in phase with the AC grid voltage peaks and no power injected onto the grid at zero-crossings of the AC grid voltage. The charging and discharging of the capacitor 220 to provide the peak inverter output power results in an oscillating current $I_{cap}$ through the capacitor 220. The current $I_{cap}$ oscillates at the same frequency but 180° out of phase with the AC output power from the inverter 102; i.e., peak current into the capacitor occurs when the inverter AC output power is zero, and peak current drawn from the capacitor 220 occurs when the inverter AC output power is peak.

The variation in the current $I_{cap}$ results in a corresponding variation in a voltage $V_{cap}$ across the capacitor 220, i.e., a ripple voltage, where $I_{cap}$ and $V_{cap}$ are 90° out of phase. The effects of the ripple voltage across the capacitor 220 provide an opportunity for the MPP control module to determine whether the PV module 104 is operating above or below the MPP and to drive the operating voltage control module to shift the PV module operating voltage in the appropriate direction toward the MPP, as further described below.

Figure 3:
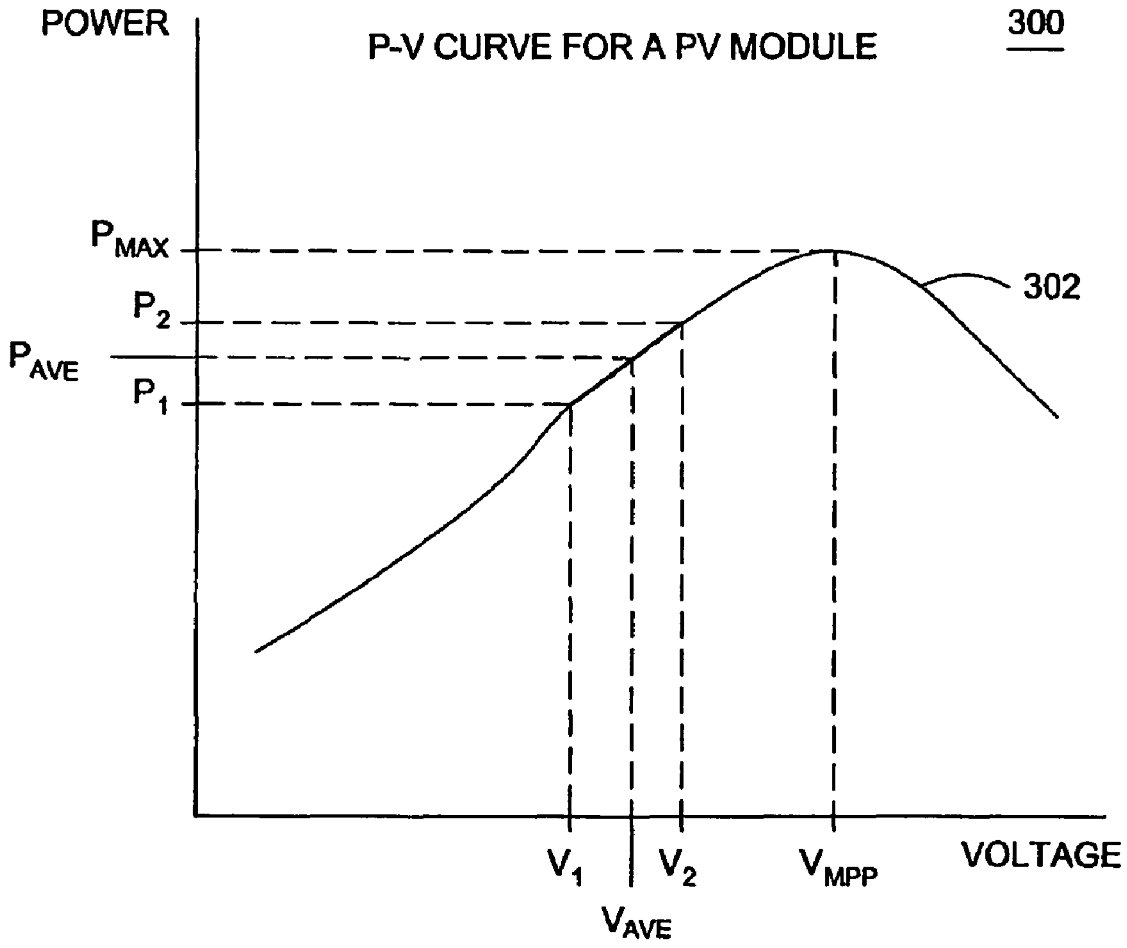
FIG. 3 is a graphical diagram of P-V curve depicting a PV module output power in accordance with one or more embodiments of the present invention.

FIG. 3 is a graphical diagram 300 of P-V curve 302 depicting a PV module output power in accordance with one or more embodiments of the present invention. For a given solar irradiance and temperature, the P-V curve 302 depicts output power from the PV module 104 as a function of operating voltage of the PV module 104. A voltage $V_{MPP}$ corresponds to a maximum power point on the curve 302 where the PV module 104 generates a maximum possible output power, $P_{MAX}$.

As described above, the ripple voltage across the capacitor 220 results in a corresponding ripple voltage overriding the PV module average operating voltage, $V_{ave}$. Analogous to the ripple voltage across the capacitor 220, the ripple voltage across the PV module 104 is 90° out of phase with the AC output power from the inverter 102. The ripple voltage across the PV module 104 "exercises" a portion of the P-V curve by moving between two operating voltages, $V_1$ and $V_2$, where $V_2$ is greater than $V_1$ as depicted in FIG. 3.

As the PV module ripple voltage across the PV module fluctuates between $V_1$ and $V_2$, the PV module output power fluctuates between the values $P_1$, corresponding to $V_1$, and $P_2$, corresponding to $V_2$, as depicted on the P-V curve 302. If an average PV module output power for operating voltages between $V_{ave}$ and $V_2$ is greater than an average PV module output power for operating voltages between $V_1$ and $V_{ave}$, the PV module is operating below the MPP. Alternatively, if an average PV module output power when the operating voltage is between $V_{ave}$ and $V_2$ is less than an average PV module output power when the operating voltage is between $V_1$ and $V_{ave}$, the PV module is operating above the MPP. Thus, the difference between the average PV module output power generated when the operating voltage is above $V_{ave}$ and when the operating voltage is below $V_{ave}$ identifies whether the PV module 104 is operating above or below the MPP, and thereby indicates in which direction the PV module operating voltage must be shifted to achieve the MPP. Additionally, if the difference is zero, the PV module 104 is biased at the MPP.

In some embodiments, such a power difference may be determined by subtracting an average PV module output power during a 90°-180° phase of an AC grid waveform cycle (i.e., when the voltage across the PV module 104, and hence the voltage across the capacitor 220, is below the average voltage) from an average PV module output power during a 180°-270° phase of the same AC grid waveform cycle (i.e., when the voltage across the PV module 104, and hence the voltage across the capacitor 220, is above the average voltage). A positive power difference indicates that the PV module 104 is operating below the MPP, and the PV module operating voltage must be increased to achieve the MPP; a negative power difference indicates that the PV module 104 is operating above the MPP, and the PV module operating voltage must be decreased to achieve the MPP. Such adjustments to the PV module operating voltage are iteratively determined by the second feedback loop 218 and implemented by the first feedback loop 216 until the power difference becomes zero. At such time when the power difference becomes zero, the average PV module output power during each measured portion of the AC grid waveform is "balanced", indicating that the PV module operating voltage corresponds to $V_{MPP}$.

Figure 4:
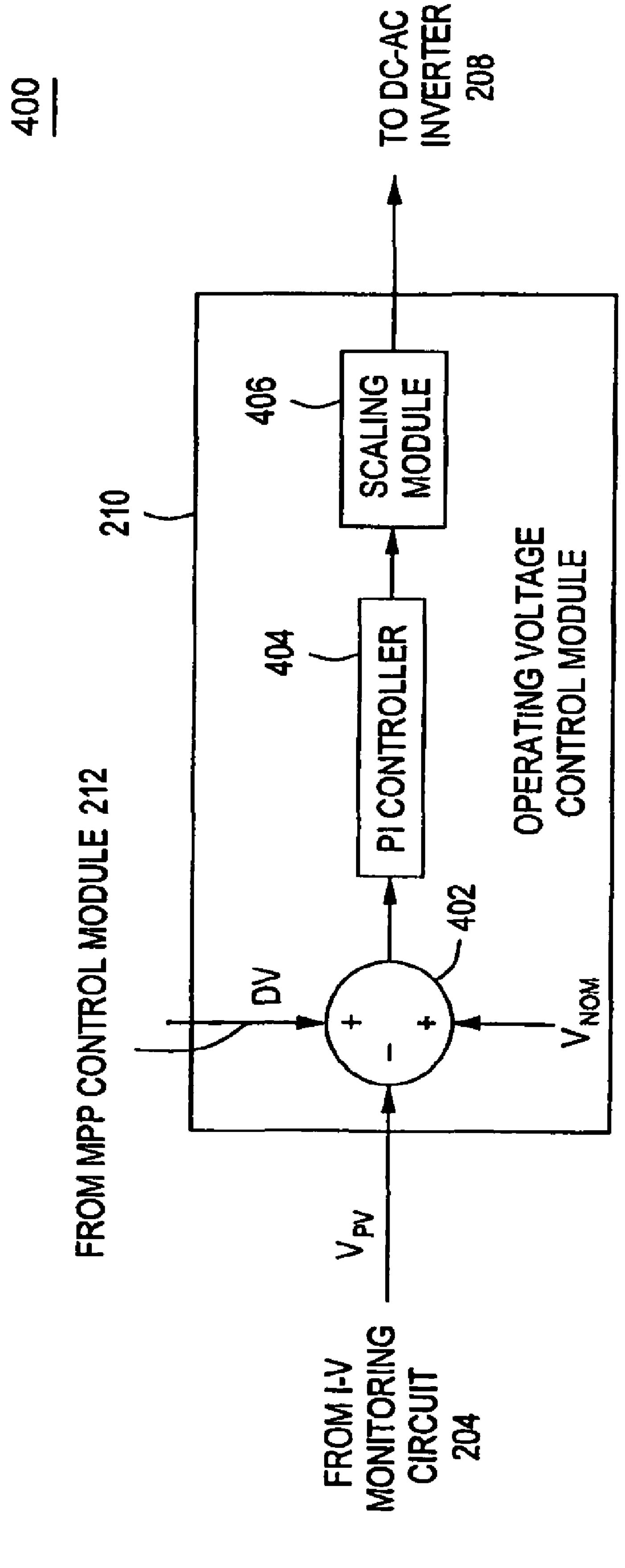
FIG. 4 is a block diagram of an operating voltage control module in accordance with one or more embodiments of the present invention.

FIG. 4 is a block diagram 400 of an operating voltage control module 210 in accordance with one or more embodiments of the present invention. The operating voltage control module 210 comprises an adder/subtractor 402, a proportional-integral (PI) controller 404, and a scaling module 406. The operating voltage control module 210 utilizes the first feedback loop 216 to control the required inverter output current $I_{req}$ such that the PV module 104 is biased at a desired operating voltage.

The adder/subtractor 402 receives a pre-defined nominal voltage input, $V_{nom}$, and further receives an integrated error signal input, dV, from the MPP control module 212. The summation of the nominal voltage and the integrated error signal provides a desired operating voltage for the PV module 104. The nominal voltage provides an initial estimate of the MPP voltage, and the integrated error signal then "fine-tunes" the nominal voltage to achieve the actual MPP voltage. Upon initial operation of the inverter 102, i.e., during at least one commercial power grid cycle when the inverter 102 first begins operating, the integrated error signal is equal to zero.

The adder/subtractor 402 additionally receives a signal indicative of the instantaneous PV module operating voltage, $V_{PV}$, from the I-V monitoring circuit 204. The output of the adder/subtractor 402 couples a difference between the desired PV module operating voltage (i.e., a set point) and the current PV module operating voltage to the PI controller 404. The PI controller 404 acts to correct the difference by estimating an output current required from the PV module 104 that will result in biasing the PV module 104 at the desired operating voltage.

The output of the PI controller 404 is coupled to the scaling module 406 and provides a signal indicative of the estimated PV module output current. Based on the estimated PV module output current, the scaling module 406 determines a required output current from the inverter 102, $I_{req}$, and drives the conversion module 206 to generate the current $I_{req}$. In one embodiment, the required output current $I_{req}$ can be expressed as follows:

$$I_{req}(nT)=\alpha(V_{nom}-V_{PV}(nT))+\beta(V_{nom}-V_{PV}((n-1)T)+I_{req}((n-1)T)$$

In the above equation, T is the cycle time of the commercial power grid, and the loop parameters α and β are chosen to ensure fast convergence and high stability.

Figure 5:
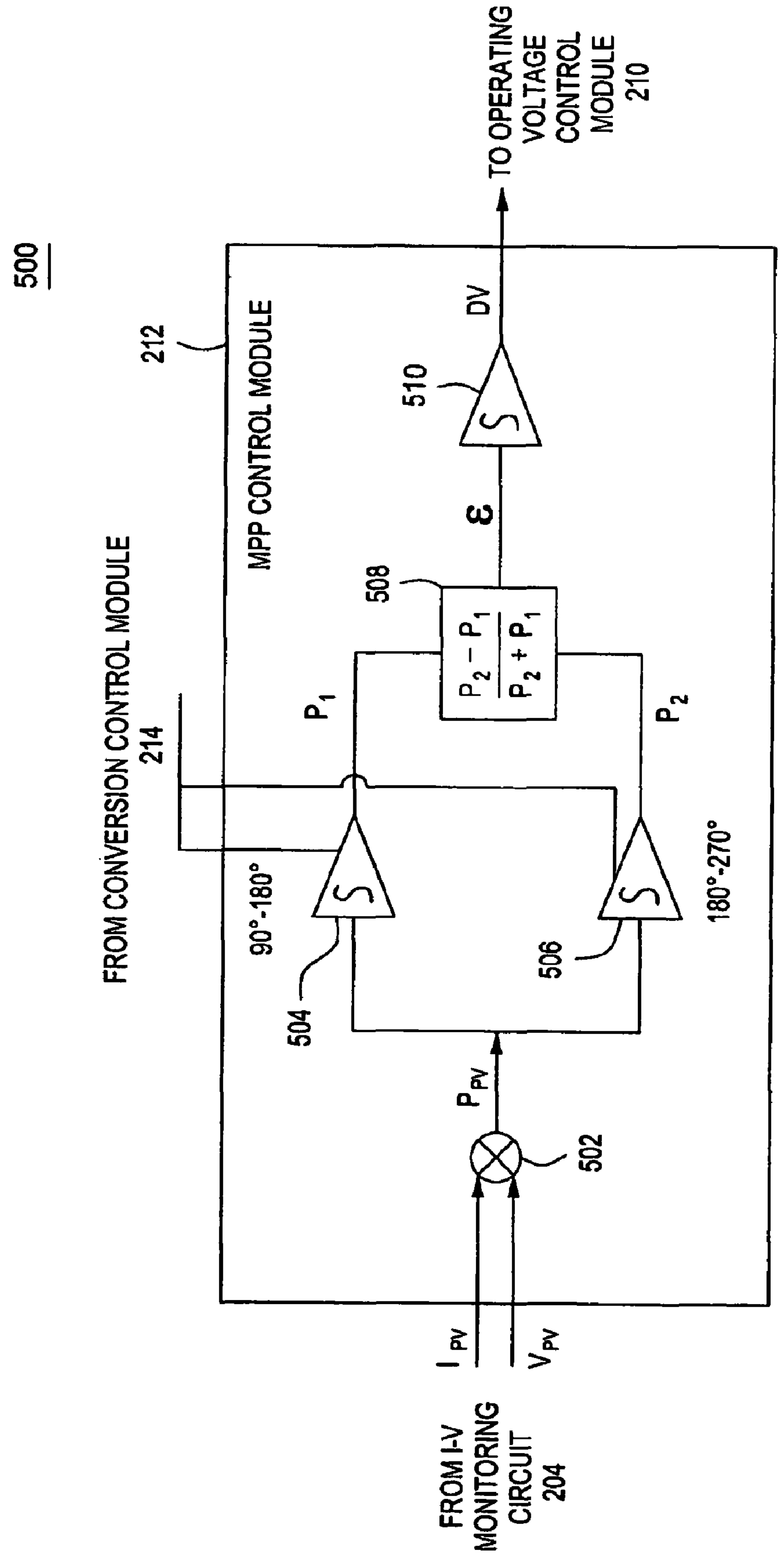
FIG. 5 is a block diagram of an MPP control module in accordance with one or more embodiments of the present invention.

FIG. 5 is a block diagram of an MPP control module 212 in accordance with one or more embodiments of the present invention. The MPP control module 212 comprises a multiplier 502, two integrators 504 and 506, a power difference module 508, and a third integrator 510. The MPP control module 212 utilizes the second feedback loop 218 to determine an error signal such that a desired operating voltage for biasing the PV module 104 corresponds to the MPP voltage.

The multiplier 502 receives signals indicative of the instantaneous PV module output current and voltage, $I_{PV}$ and $V_{PV}$, respectively, from the I-V monitoring circuit 204, and generates an output signal indicative of the instantaneous PV module output power, $P_{PV}$. The output of the multiplier 502 is coupled to each of the integrators 504 and 506; additionally, the integrators 504 and 506 receive a signal indicative of the AC grid waveform cycle from the conversion control module 214, for example, from a phase lock loop of the conversion control module 214. The integrator 504 integrates the power $P_{PV}$ during the 90°-180° phase of an AC grid waveform cycle to obtain a first power measurement, $P_1$. The integrator 506 integrates the power $P_{PV}$ during the 180°-270° phase of the same AC grid waveform cycle to obtain a second power measurement, $P_2$. The output from each of the integrators 504 and 506 are coupled to the power difference module 508. The power difference module 508 computes a power difference between $P_1$ and $P_2$ and utilizes the power difference to determine an error signal, $\epsilon$. In some embodiments, the power difference is computed as $(P_2-P_1)/(P_2+P_1)$.

The error signal $\epsilon$ from the power difference module 508 is coupled to the integrator 510. The integrator 510 integrates the error signal $\epsilon$; the resulting integrated error signal, dV, is coupled to the operating voltage control module 210 as described above in relation to FIG. 4. In some embodiments, the digital integrator 510 integrates the error signal $\epsilon$ as follows:

$$dV(nT)=\alpha*\epsilon(nT)+dV((n-1)T)$$

In the above equation, T is a ripple voltage cycle time of the ripple voltage across the capacitor 220, and $\alpha$ is pre-selected. In some embodiments, where the commercial power grid operates at 60 Hz, the ripple voltage cycle time is 8.3 msec.

The integrated error signal functions to generate a desired PV module operating voltage corresponding to the MPP voltage. The integration by the integrator 510 acts to accumulate voltage adjustments accrued over time, and thus drives the desired operating voltage to the MPP voltage.

Figure 6:
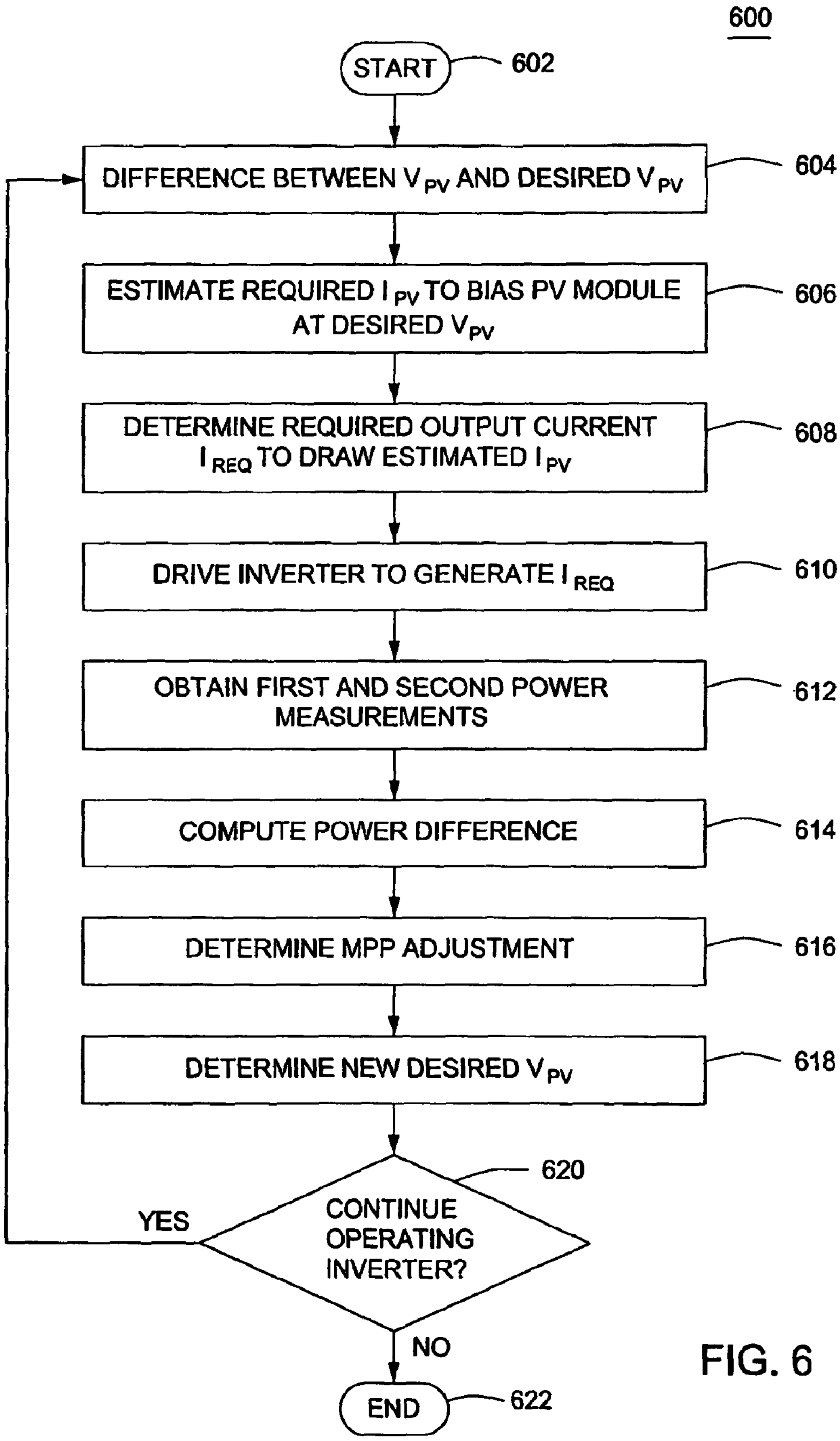
FIG. 6 is a flow diagram of a method for utilizing dual feedback loops to bias a PV module at an MPP voltage in accordance with one of more embodiments of the present invention.

FIG. 6 is a flow diagram of a method 600 for utilizing dual feedback loops to bias a PV module at an MPP voltage in accordance with one of more embodiments of the present invention. In the method 600, an inverter is coupled to a PV module for converting DC power generated by the PV module to AC power. The inverter is further coupled to a commercial power grid such that the AC power produced is coupled to the commercial power grid in-phase with the commercial AC power. In some embodiments, multiple PV modules may be coupled to a single centralized inverter; alternatively, individual PV modules may be coupled to individual inverters (e.g., one PV module per inverter). In some embodiments, a DC-DC converter may be coupled between the PV module or PV modules and the inverter.

The method 600 begins at step 602 and proceeds to step 604. At step 604, a difference between an instantaneous PV module operating voltage and a desired operating voltage is determined. Initially, an estimate of the MPP voltage of the PV module may be used as the desired operating voltage. At step 606, the difference from step 604 is utilized to estimate an output current from the PV module, $I_{PV}$, which will result in biasing the PV module at the desired operating voltage. The method 600 proceeds to step 608. As step 608, a required output current from the inverter, $I_{req}$, is determined such that the estimated PV module output current $I_{PV}$ will be drawn from the PV module. At step 610, the inverter supplies the appropriate current to a conversion module within the inverter to generate the required output current $I_{req}$.

The steps 604 through 610 of the method 600 comprise a first feedback loop that utilizes a difference between a current operating voltage of the PV module and a desired operating voltage of the PV module to drive the PV module to the desired operating voltage.

The method 600 proceeds to step 612, where a first and a second power measurement of the PV module output power are each obtained. In some embodiments, the first power measurement comprises integrating the PV module output power during a 90°-180° phase of an AC grid waveform cycle (i.e., a first "bin"), and the second power measurement comprises integrating the PV module output power during the 180°-270° phase of the same AC grid waveform cycle (i.e., a second "bin"). In some embodiments, the PV module output power may be sampled during such phases to obtain the first and second power measurements; for example, the PV module output power may be sampled at a rate of 256 times the commercial power grid frequency. In alternative embodiments, the first and second power measurements may be obtained during different phases of an AC grid waveform cycle.

At step 614, a difference between the first and second power measurements, i.e., a power difference between the bins, is computed. In some embodiments, the power difference comprises subtracting the first power measurement from the second power measurement, and dividing by a sum of the first and second power measurements. The power difference indicates whether the PV module is operating above or below the MPP, or, in the case of a power difference equal to zero, that the PV module is operating at the MPP. In some embodiments, a positive power difference indicates that the PV module is operating below the MPP, and that the PV module operating voltage must be increased to reach MPP; a negative power difference indicates that the PV module is operating above the MPP, and that the PV module operating voltage must be decreased to reach MPP.

The method 600 proceeds to step 616, where an error signal is determined based on the power difference. The error signal functions to generate a desired PV module operating voltage that corresponds to the MPP voltage. In some embodiments, the error signal is integrated to obtain an integrated error signal. At step 618, a new desired PV module operating voltage is determined in accordance with the error signal. In some embodiments, the new desired PV module operating voltage comprises a summation of the error signal and a nominal voltage, where the nominal voltage represents an initial estimate of the MPP voltage.

The steps 612 through 618 of the method 600 comprise a second feedback loop that determines whether the current PV module operating voltage corresponds to the MPP voltage, and, if necessary, adjusts the desired operating voltage to achieve the MPP.

The method 600 proceeds to step 620, where it is determined whether to continue operation of the inverter. If the condition at step 620 is satisfied, the method 600 returns to step 604. If the condition at step 620 is not satisfied, the method 600 proceeds to step 622 where it ends.

While the foregoing is directed to embodiments of the present invention, other and further embodiments of the invention may be devised without departing from the basic scope thereof, and the scope thereof is determined by the claims that follow.

The invention claimed is:

1. An apparatus for converting DC input power to AC output power, comprising:

a conversion module comprising an input capacitor;

a first feedback loop for determining a maximum power point (MPP) and operating the conversion module proximate the MPP; and a second feedback loop for determining a difference in energy storage and delivery by the input capacitor, producing an error signal indicative of the difference, and coupling the error signal to the first feedback loop to adjust at least one operating parameter of the conversion module to drive toward the MPP.

2. The apparatus of claim 1, wherein the error signal is determined based on a difference between a first power measurement and a second power measurement.

3. The apparatus of claim 2, wherein the first power measurement measures the DC input power during a first phase range of a cycle of a commercial power grid and the second power measurement measures the DC input power during a second phase range of the cycle.

4. The apparatus of claim 3, wherein the first power measurement comprises an average DC input power during the first phase range and the second power measurement comprises an average DC input power during the second phase range.

5. The apparatus of claim 3, wherein the first phase range and the second phase range are of equal length.

6. The apparatus of claim 1, wherein the second feedback loop comprises an integrator for integrating the error signal.

7. A method for converting DC input power to AC output power, comprising:

determining a maximum power point (MPP);

operating a conversion module proximate the MPP, wherein the steps of determining an MPP and operating a conversion module are implemented via a first feedback loop;

determining a difference in energy storage and delivery within the conversion module;

producing an error signal indicative of the difference; and coupling the error signal to the first feedback loop to adjust at least one operating parameter of the conversion module to drive toward the MPP, wherein the steps of determining a difference, producing an error signal, and coupling the error signal are implemented via a second feedback loop.

8. The method of claim 7, wherein the energy storage and delivery is performed by a capacitor.

9. The method of claim 7, wherein the error signal is determined based on a difference between a first power measurement and a second power measurement.

10. The method of claim 9, wherein the first power measurement measures the DC input power during a first phase range of a cycle of a commercial power grid, and the second power measurement measures the DC input power during a second phase range of the cycle.

11. The method of claim 10, wherein the first power measurement comprises an average DC input power during the first phase range and the second power measurement comprises an average DC input power during the second phase range.

12. The method of claim 10, wherein the first phase range and the second phase range are of equal magnitude.

13. The method of claim 7, further comprising integrating the error signal.

14. A system for converting DC input power to AC output power, comprising:

at least one photovoltaic (PV) module;

at least one conversion module comprising an input capacitor;

at least one first feedback loop for determining a maximum power point (MPP) and operating the at least one conversion module proximate the MPP; and at least one second feedback loop for determining a difference in energy storage and delivery by the input capacitor, producing an error signal indicative of the difference, and coupling the error signal to the at least one first feedback loop to adjust at least one operating parameter of the at least one conversion module to drive toward the MPP.

15. The system of claim 14, wherein the error signal is determined based on a difference between a first power measurement and a second power measurement.

16. The system of claim 15, wherein the first power measurement measures the DC input power during a first phase range of a cycle of a commercial power grid and the second power measurement measures the DC input power during a second phase range of the cycle.

17. The system of claim 14, further comprising at least one DC-DC converter, wherein the at least one DC-DC converter is coupled to the at least one conversion module.

* * * * *